Dec. 18, 1956 P. FONER 2,774,265
AUTOMOTIVE UNIT
Filed Feb. 16, 1954
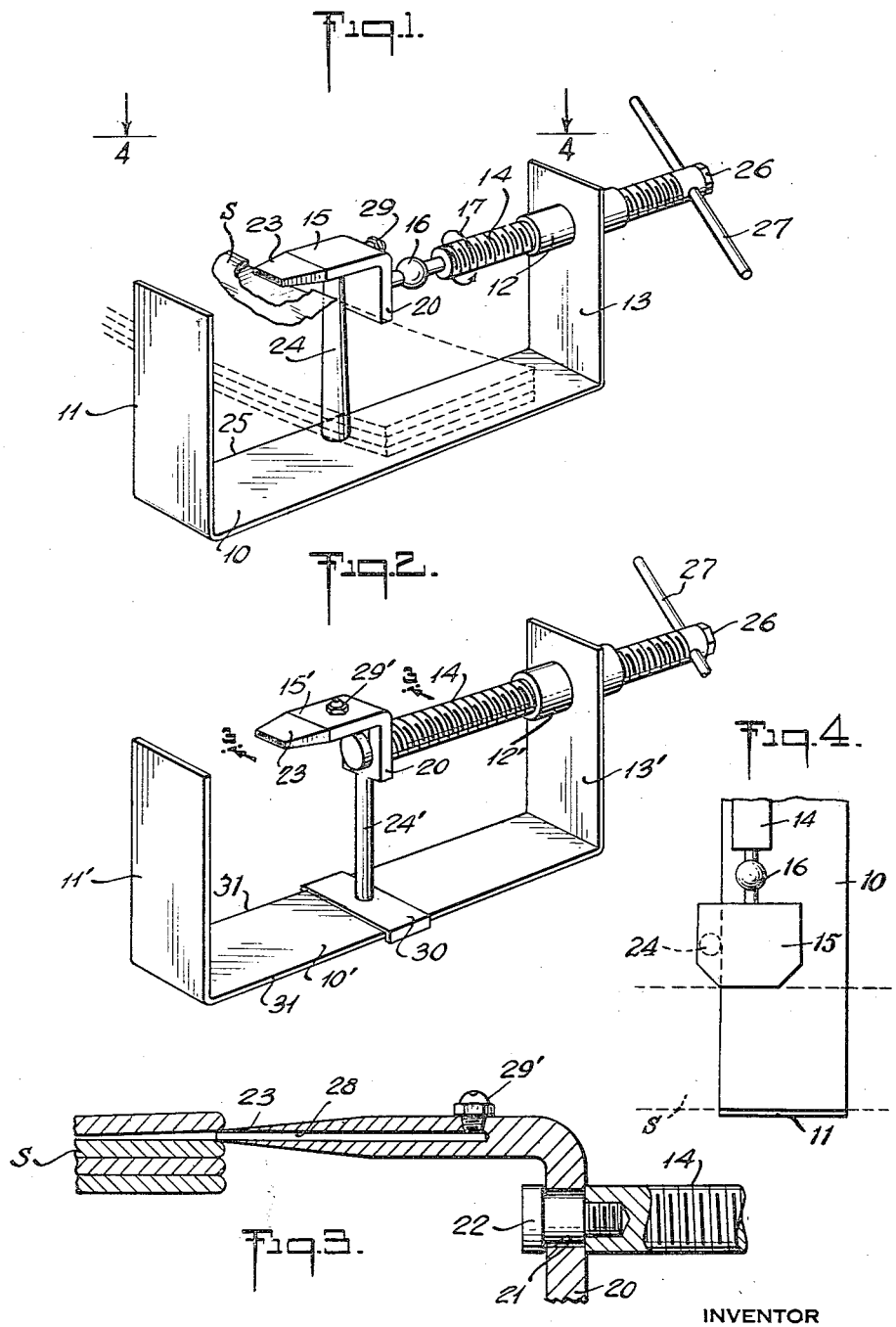
INVENTOR
*PHILIP FONER*
BY
*Harry Sommers*
ATTORNEY United States Patent Office 2,774,265
Patented Dec. 18, 1956

2,774,265
AUTOMOTIVE UNIT

Philip Foner, Newark, N. J.

Application February 16, 1954, Serial No. 410,538

2 Claims. (Cl. 81—3.7)

This invention relates to automotive units and more particularly to a device designed, for example, for the separation of leaf springs. The device of the invention is designed to facilitate such separation of members and may further provide for the lubrication thereof, a single compact unit achieving these ends in a convenient and highly efficient and error-proof manner pursuant to the invention.

The device embodies novel features of construction and operation which are more particularly described below.

These and other advantageous objects, which will appear from the drawings and from the description hereinafter, are accomplished by the structure of my invention, of which an embodiment is illustrated in the drawings. It will be apparent, from a consideration of said drawings and the following description, that the invention may be embodied in other forms suggested thereby, and such other forms as come within the scope of the appended claims are to be considered within the scope and purview of the instant invention.

In the drawings, Fig. 1 is a perspective view of an automotive unit embodying the invention, Fig. 2 is another view of a similar form thereof and Fig. 3 is a fragmentary sectional view thereof, taken on line 3—3 of Fig. 2 and Fig 4. is a top plan view taken on line 4—4 of Fig. 1.

As shown in the drawings, the device of this invention is adapted for separation of members, for example, the leaves of the spring S or other member to be separated, and comprises a base member 10 having a vertical guide 11 secured to one end thereof and adapted to abut one of the side edges of the member S to be separated. A bearing 12 is mounted on said base member, for example, by means of a plate 13. A bar 14 is movably positioned in said bearing. Said bar and bearing are provided with complementary threaded portions or other suitable means for controlled movement of the bar in the bearing. A pointed separation finger 15 is secured to one end of the bar, as for an example, by a universal joint connection 16 shown in Fig. 1, or providing finger 15 with a flanged extension 20 shown in Fig. 2 which has an aperture 21 to freely receive the pin 22 which is threaded into the free end of the bar 14.

Parts shown in Fig. 2 which generally correspond with those shown in Fig. 1 are indicated by the same reference characters with a prime number.

Finger 15 is provided with a pointed end 23 adapted, on movement of the bar 14 for positioning the device as shown in Figs. 1 and 2 in registry with the spring S to pry apart elements of the spring or other object to be separated, as shown in Fig. 3. The finger 15 is provided with means to guide the latter for movement in a plane parallel with the axis of base member 10. Said means may constitute as shown in Fig. 1, a depending arm 24 so proportioned as to extend below the base plate 10 and engage an edge 25 thereof. The portion of bar 14 extending from the plate 13 is preferably provided with a head 26 which may be of hexagonal or other convenient outline for engagement by a tool if it is desired to provide considerable pressure thereto. Sufficient pressure may normally be exerted for rotation of bar 14 by providing a handle such as a bar or rod 27 passed through an aperture in the bar 14 or otherwise secured thereto.

Rotation of the bar 14 is in the direction of the arrow 17 in Fig. 1; the arm 24 will tend to engage the edge 25 of the base member 10 and thereby preclude accidental rotation of the finger 15 responsive to the rotation of the bar 14.

The finger 15 and its extended pointed end 23 may be provided with an opening 28 therein and a grease fitting 29 may be connected to said opening so that when the device is used as shown in Fig. 3 to pry apart the leaves of a spring, grease or other lubricant may be readily applied through the opening 28 and intermediate the spring leaves so separated. In the form shown in Fig. 2, the arm 24' of finger 15' is so proportioned that it extends below the base member 10 and is provided at the lower end thereof with a U-shaped bracket 30 straddling the base plate 10' and engaging the marginal edges 31 thereof.

Having thus described my invention, what I claim as new and desire to secure by Letters Patent is:

1. An automotive device for separation of spring leaves comprising an elongated base member having a longitudinal edge, a flat guide member secured to and extending upwardly perpendicular to one end thereof and adapted to bear against and abut one of the side edges of the spring leaves to be separated, with the base member positioned below said leaves to be separated, a bearing on said base member, a bar member movably positioned in said bearing, complementary means on said bar member and bearing for controlled movement of said bar member toward and away from the guide member, a pointed separation finger, means to secure the finger to the end of said bar member for movement, on movement of the bar, intermediate the spring leaves to be separated, and arm means depending from the finger abutting a longitudinal edge of the base member to guide the finger for movement in a plane parallel to the axis of said longitudinal edge of the base member.

2. An automotive device for separation of spring leaves comprising an elongated base member having longitudinal edges, a flat guide member secured to and extending upwardly perpendicular to one end thereof and adapted to bear against and abut one of the side edges of the spring leaves to be separated, with the base member positioned below said leaves to be separated, a bearing on said base member, a bar member threadedly engaging said bearing and adapted, on rotation, to move in said bearing toward and away from the guide member, a pointed separation finger, means to secure the finger to the end of said bar member for non-rotational movement, on rotational movement of the bar member, intermediate the spring leaves to be separated, and arm means secured to and depending from the finger at an angle to the axis of said bar member engaging a longitudinal edge of said base member to guide the finger for movement in a plane parallel to the axis of the base member on rotation of said bar member.

References Cited in the file of this patent

UNITED STATES PATENTS

| 378,896 | Mooney | Mar. 6, 1888 |
| 1,142,280 | Stevenson | June 8, 1915 |
| 1,177,352 | Phillips | Mar. 28, 1916 |
| 1,338,111 | Strive | Apr. 27, 1920 |
| 1,419,210 | Bradford | June 13, 1922 |
| 1,781,997 | Berezowski | Nov. 18, 1930 |